(12) United States Patent
Braun

(10) Patent No.: US 7,918,608 B2
(45) Date of Patent: Apr. 5, 2011

(54) MULTI-ROW THRUST BALL BEARING WITH UNSYMMETRICAL LOAD DISTRIBUTION

(75) Inventor: Soeren Braun, Zeuthen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 430 days.

(21) Appl. No.: 12/078,814

(22) Filed: Apr. 7, 2008

(65) Prior Publication Data
US 2008/0247699 A1   Oct. 9, 2008

(30) Foreign Application Priority Data

Apr. 5, 2007   (DE) .......................... 10 2007 016 591

(51) Int. Cl.
*F16C 23/06* (2006.01)
*F16C 33/60* (2006.01)
*F16C 33/58* (2006.01)

(52) U.S. Cl. ......... 384/504; 384/500; 384/517; 384/563

(58) Field of Classification Search ................. 384/504, 384/517–519, 535, 583, 598, 611, 613
See application file for complete search history.

(56) References Cited

U.S. PATENT DOCUMENTS

| | | | |
|---|---|---|---|
| 1,448,189 A * | 3/1923 | Brunner ...................... 384/611 |
| 2,467,437 A | 4/1949 | Martinec |
| 2,597,161 A | 5/1952 | Megel |
| 3,909,085 A | 9/1975 | Wilkinson |
| 3,943,803 A * | 3/1976 | Hafla .............. 384/563 |
| 4,227,755 A * | 10/1980 | Lundberg ...................... 384/518 |
| 4,486,055 A * | 12/1984 | Rohloff ........................ 384/535 |
| 4,529,324 A * | 7/1985 | Champagne et al. ......... 384/518 |
| 4,547,083 A | 10/1985 | Hoerler |
| 4,641,978 A * | 2/1987 | Kapich ........................ 384/624 |
| 4,693,616 A | 9/1987 | Rohra |
| 4,892,423 A * | 1/1990 | Takahashi et al. ............ 384/611 |
| 5,316,393 A * | 5/1994 | Daugherty .................... 384/517 |
| 6,186,758 B1 * | 2/2001 | Shaw ........................... 418/203 |
| 6,918,746 B2 * | 7/2005 | Duerr et al. .................... 415/206 |
| 7,082,691 B2 * | 8/2006 | Glantz .......................... 384/518 |
| 2003/0190099 A1 | 10/2003 | Alam |

FOREIGN PATENT DOCUMENTS

| | | |
|---|---|---|
| DE | 35 32 456 A1 | 3/1987 |
| DE | 102 58 528 B4 | 7/2004 |
| EP | 01 43 950 A2 | 6/1985 |
| FR | 11 97 777 | 12/1959 |
| GB | 14 32 796 | 4/1976 |

* cited by examiner

*Primary Examiner* — Marcus Charles
(74) *Attorney, Agent, or Firm* — Timothy J. Klima; Shuttleworth & Ingersoll, PLC

(57) ABSTRACT

An axial bearing arrangement has at least two rolling-contact bearings (1, 2), each of which includes one outer ring (3, 4) and at least one inner ring (5, 6). The inner rings (5, 6) are axially fixedly mounted on a shaft (7). The outer ring (8) of a first bearing (1) is axially slideably located on a casing (9) by at least one elastically deformable tensioning element (8). The outer ring (4) of a second bearing (2) is axially slideably located on the casing (9) and engageable against at least one stop (10) of the casing (9), when moved in the axial direction.

16 Claims, 4 Drawing Sheets

Load distribution on individual bearings and displacement of bearing outer rings as a function of the shaft load (example)

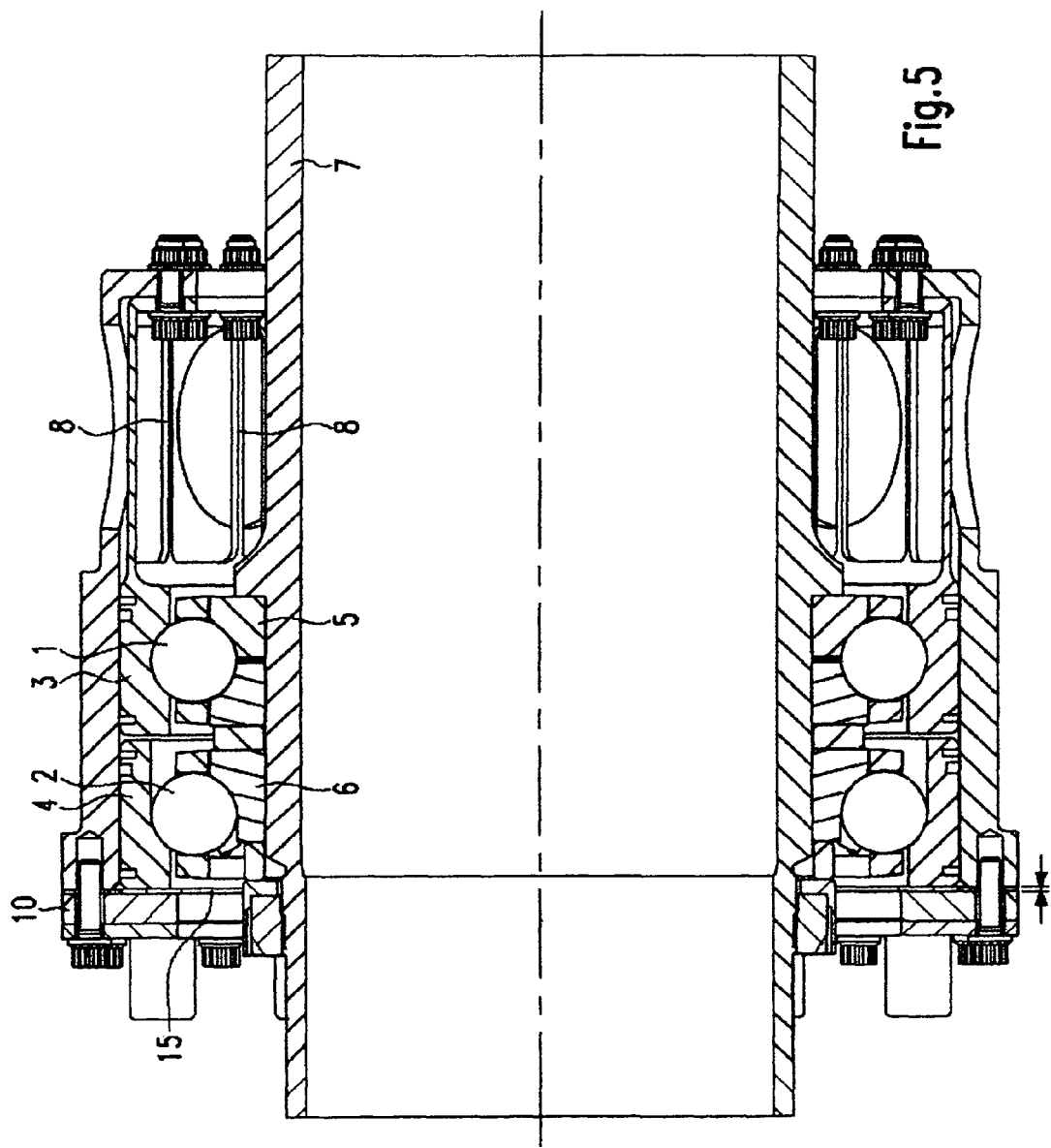

MULTI-ROW THRUST BALL BEARING WITH UNSYMMETRICAL LOAD DISTRIBUTION

This application claims priority to German Patent Application DE102007016591.0 filed Apr. 5, 2007, the entirety of which is incorporated by reference herein.

This invention relates to a multi-row thrust ball bearing with unsymmetrical load distribution.

For axially loaded bearings of aircraft engines, single-row ball bearings in three-point or four-point configuration are usually employed.

At high rotational speeds and high axial loads, the load-carrying capacity of these bearings is limited since either the contact stress occurring between rolling bodies and raceways exceeds the permissible maximum or service-life is below the required values. Currently existing multi-row bearing concepts are incapable of providing a definable load distribution over all bearing rows as well as under changing temperature conditions with pronounced temperature gradients from inside to outside.

The present invention, in a broad aspect, provides for an axial bearing arrangement of the type specified above, which is capable of transmitting high axial loads, features a long service-life and is characterized by simple design and easy, cost-effective producibility.

According to the present invention, an axial bearing arrangement with at least two rolling-contact bearings is provided, each of which includes one outer ring and at least one inner ring, with the inner rings being axially fixedly mounted on a shaft, with the outer ring of a first bearing being axially slideably located on a casing by at least one elastically deformable tensioning element, and with the outer ring of a second bearing being axially slideably located on the casing and settable against at least one stop of the casing, when moved in the axial direction.

The present invention accordingly provides for a defined distribution of the bearing load over both bearings (bearing rows). This allows the individual bearings/bearing rows to be exactly calculated as regards their functional characteristics, in particular, contact stress (stress in rolling contact) and speed of drift (slide, slip), for example.

Furthermore, the axial bearing arrangement according to the present invention is capable of accepting temperature gradients without any problems. This allows broad operating spectra to be covered, as required on aircraft engines.

Further design features, such as squeeze-oil dampers acting between the outer ring and the casing to provide hydraulic vibration damping, can be integrated without any problems.

The axial bearing arrangement according to the present invention is further advantageous in that it is compactly designed and can be embodied with low weight.

Furthermore, the bearing arrangement according to the present invention is also capable of accepting a load reversal.

Figure 1:
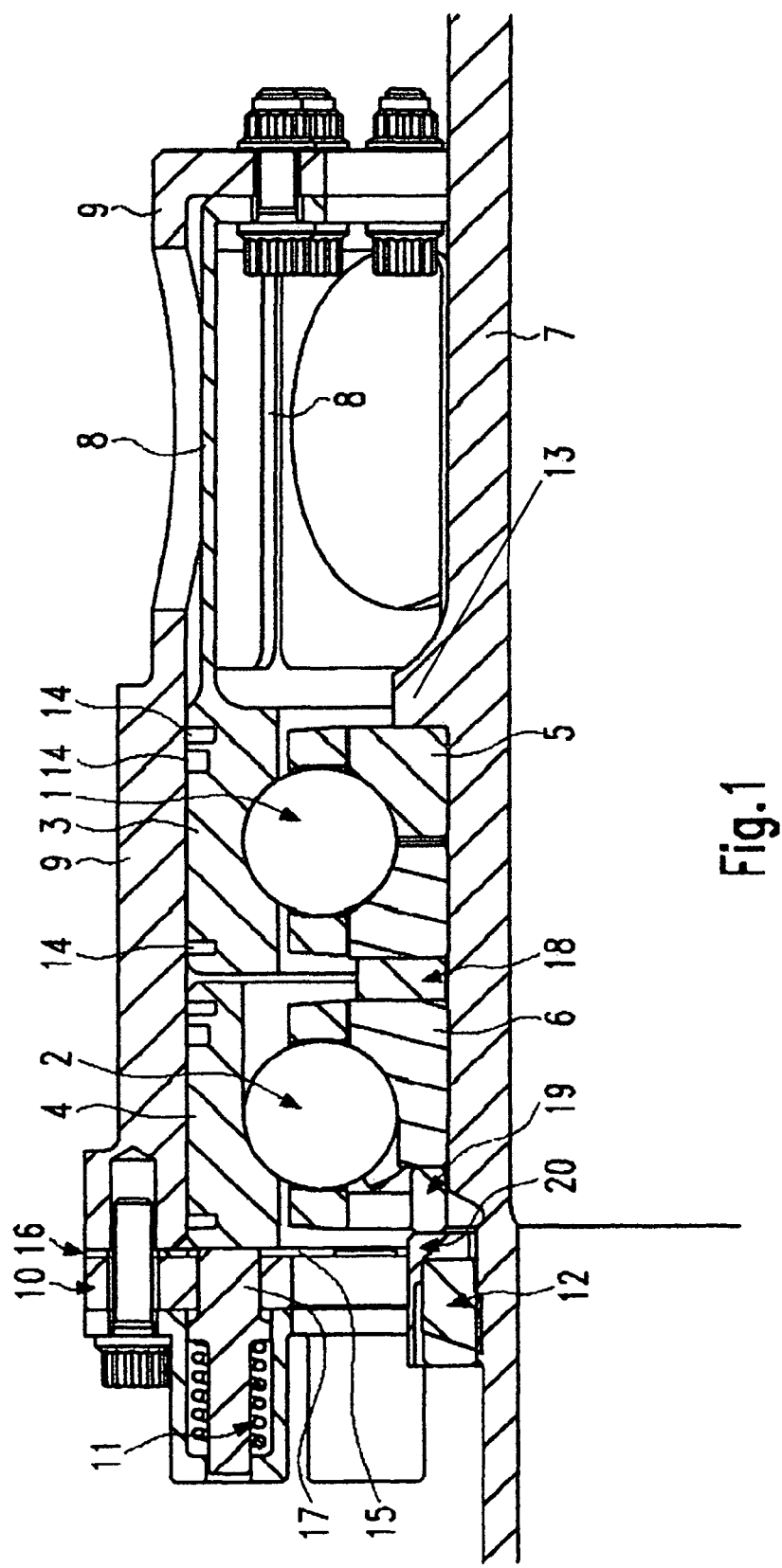
Figure 2:
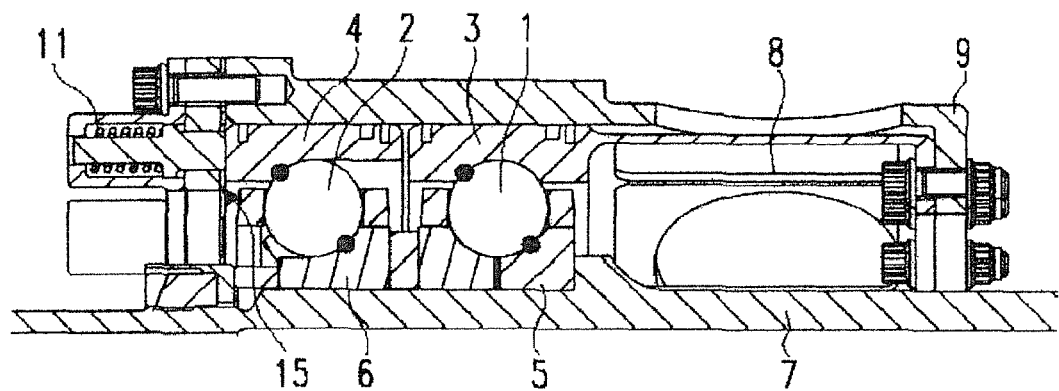
Figure 3:
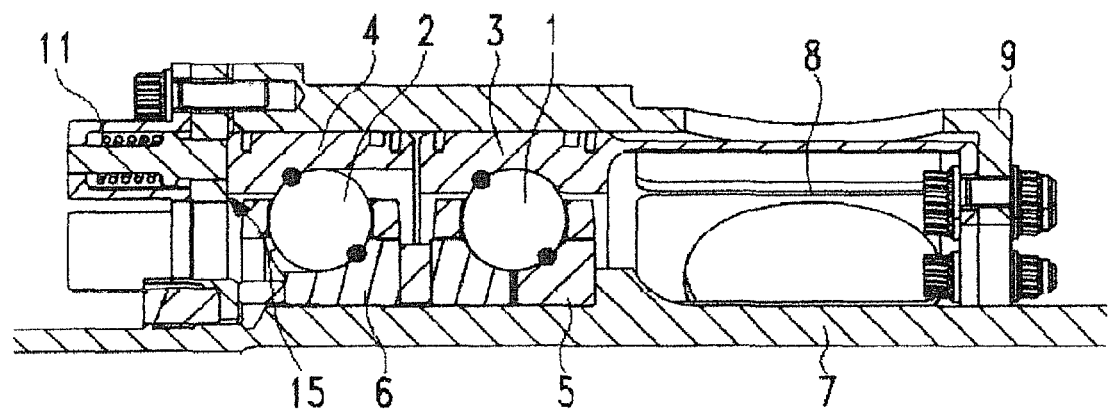
Figure 4:
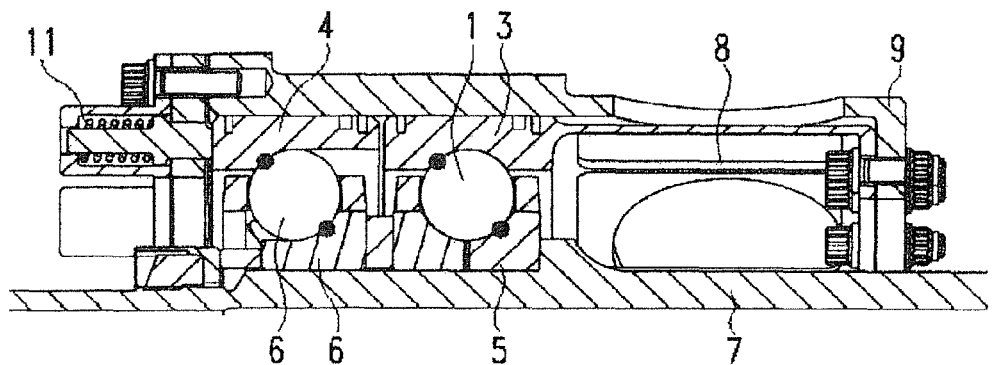
Figure 6:
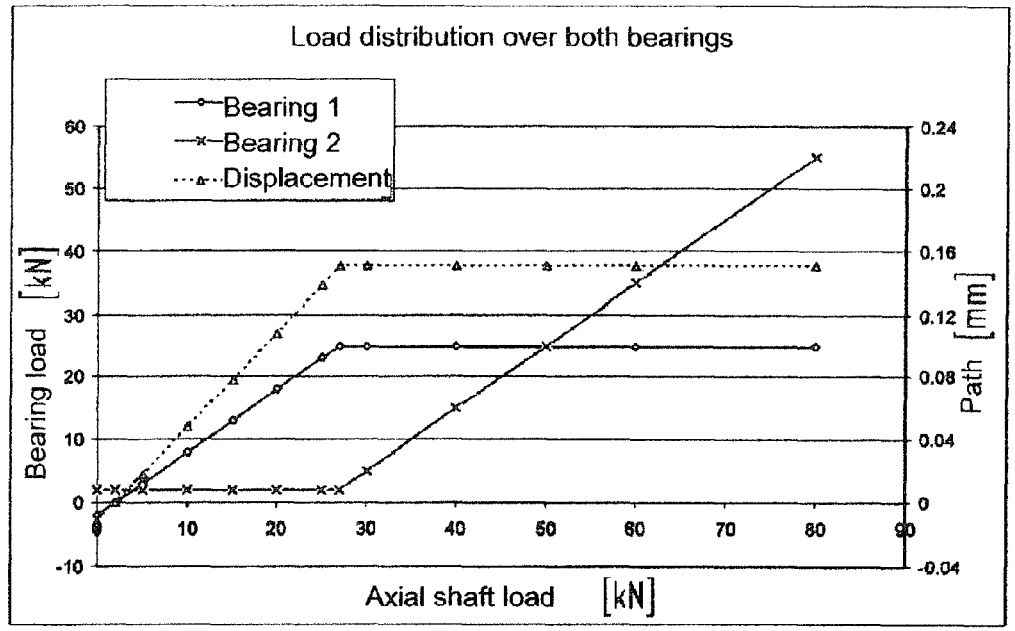

The present invention is more fully described in the light of the accompanying drawings showing preferred embodiments. In the drawings, FIG. 1 is an axial partial sectional view of the axial bearing arrangement in accordance with the present invention, FIGS. 2 to 4 show different load conditions of the axial bearing arrangement shown in FIG. 1, FIG. 5 is a total sectional view analogically to FIGS. 1 to 4, and FIG. 6 is a diagram of the load distribution over both bearings.

The bearing arrangement according to present invention employs two or more ball bearings which take up the axial loads in a non-uniform, but defined manner. For simplicity, the following description is confined to two bearing rows, but it is also applicable to more rows.

A ball bearing of the bi-directional type (bearing capable of taking up axial loads in two directions) is connected to the structure by elastic rods. It takes up the loads occurring throughout the whole operating spectrum, though only up to a maximum load $F_{1,max}$.

The second bearing may be provided as a unidirectional bearing (bearing capable of taking up axial loads in only one direction); it is freely moveable opposite to the direction of load and serves to take up peak loads. While the second bearing can experience significantly higher loads than the first bearing, the second bearing is, during most of the operating phases, only minimally loaded with a force $F_{2,0}$ such that sliding problems are avoided. Only if the load to be transmitted $F_{ax}$ exceeds a value of $F_{1,max}+F_{2,0}$, the entire surplus load $F_{2,Sp}=F_{ax}-F_{1,max}$ is taken up by the second bearing.

The bearing arrangement according to the present invention is schematically shown in FIG. 1, with FIGS. 2 to 4 illustrating three typical load distribution cases. FIG. 2 shows a load case 1 where $F_{2,0}<F_{ax}<(F_{1,max}+F_{2,0})$. FIG. 3 shows a load case 2 where $F_{ax} \geq (F_{1,max}+F_{2,0})$. FIG. 4 shows a load case 3 where $F_{ax}<F_{2,0}$.

The Figures show a first bearing 1 with an outer ring 3 and an inner ring 5 (which may also be of two-part design) and a second bearing 2 with an outer ring 4 and an inner ring 6, with both bearings being secured to a shaft 7 and pre-loaded against a shoulder 13 by a shaft nut 12 and spacers 18, 19.

Attached to a casing 9 is an elastically deformable tensioning element 8 (elastic beam or rod) which is connected to the outer ring 3 of the first bearing 1.

The outer ring 4 of the second bearing 2 is axially pre-loaded by an elastic element 11 (spring) via a pressure element 17, with an air gap 15 ($s_0$) positioned between a stop 10 (stop ring) and the outer ring 4. The entire bearing is adjustable via the stop 10 which is attached to the casing 9 with at least one intermediate spacer 16 (shim).

The slots 14 shown on the outer rings 3, 4 provide for hydraulic damping (squeeze-oil dampers), as known from the state of the art, and also enable the outer rings 3, 4 to be axially moved relative to the casing 9.

In operation, the two bearing outer rings 3, 4 move in the direction of load relative to the casing 9, so that the air gap 15 ($s_0$) between the outer ring 4 of bearing 2 and the stop ring 10 is at maximum at low loads and decreases with increasing loads, amounting to 0 on reaching $F_{1,max}+F_{2,0}$. The minimum load $F_{2,0}$ on bearing 2 is, in this example, provided by a helical spring (elastic element 11), but other types of pre-loading by pneumatic, hydraulic, mechanic or other mechanisms are also possible.

As from this point, no further increase of the loads transmitted via bearing 1 can occur, and all additional axial forces of the shaft 7 will be transmitted via bearing 2.

The air gap between the two bearing outer rings 3, 4 has no defined size. However, it must be provided such that load reversal will not result in contact between the two bearing rings 3, 4.

The shim (spacer 16) must be available in different thicknesses. It serves for compensating manufacturing tolerances and setting the air gap 15 ($s_0$).

The spacers 18, 19 locate the bearing inner rings 5, 6 of bearing 1 and bearing 2 on the shaft 7. The bearing pack is axially secured via the retaining washer 20 and the shaft nut 12. Their relative position is independent of the axial shaft load.

As initial values, the permissible air gap $s_0$ (defined by the max. permissible axial movement of the shaft) and the maximum load $F_{1,max}$ on bearing 1 are to be defined. This enables the required elastic rod length to be determined using the material characteristics yield point up and modulus of elasticity E as:

$$l_B = \frac{a \cdot s_0 \cdot E}{\sigma_P}$$

and the sum of the elastic rod cross-sectional areas as:

$$A = \frac{a \cdot F_{1,max}}{\sigma_P}$$

(a=safety factor, relation of yield point $\sigma_P$ and maximum tensile stress in the elastic rods $\sigma_{B,max}$: $a=\sigma_P/\sigma_{B,max}$).

Here, the maximum load on bearing 1 is settable such that the service-life of both bearing rows, as determined over a standard cycle of the shaft load, is equalized. The present invention also provides for designs optimized in terms of installation envelope.

The shaft load applied is distributed asymmetrically, but in a defined manner, on both bearings 1, 2. Until abutment of the end face of bearing 2 onto the stop ring 10, the load $F_{2,0}$ is constantly transmitted via bearing 2. At zero load on the shaft, bearing 1 initially transmits the reverse pre-load $F_{2,0}$. With the shaft load rising to $F_W=(F_{2,0}+F_{1,max})$, initially only the load on bearing 1 is increased, with the load increase leading to an elongation of the elastic rods (elastically deformable tensioning element 8) according to Hooke's Law. Upon abutment of bearing 2 on the stop ring 10, no further elongation of the elastic rods 8, and thus no further increase of the loading on bearing 1, can occur. All additional loads will now be transmitted via bearing 2 only. The relation is shown in FIG. 5. In one embodiment, the outer ring 3 of the first bearing 1 is moveable between 20/100 mm and 10/100 mm by the elastically deformable tensioning element 8.

LIST OF REFERENCE NUMERALS

1 First bearing
2 Second bearing
3, 4 Outer ring
5, 6 Inner ring
7 Shaft
8 Elastically deformable tensioning element/elastic rod
9 Casing
10 Stop/stop ring
11 Elastic element (spring)
12 Shaft nut
13 Shoulder
14 Slot
15 Airgap $s_0$
16 Spacer/shim
17 Pressure element
18 Spacer
19 Spacer
20 Retaining washer

What is claimed is:

1. An axial bearing arrangement, comprising:
at least first and second rolling-contact bearings, each having one outer ring and at least one inner ring, wherein the inner rings are axially fixedly mounted on a shaft, the outer ring of the first bearing is axially slideably located on a casing by at least one elastically deformable tensioning element; there being a first axial direction from the first bearing toward the second bearing and a second axial direction opposite to the first axial direction; a first end of the elastically deformable element being connected to the outer ring of the first bearing and a second opposite end of the elastically deformable element being fixedly connected to the casing to exert an axial force on the outer ring of the first bearing in the second axial direction when an axial force is applied to the shaft in the first axial direction, thereby increasing an axial loading on the first bearing due to the opposing axial forces exerted on the first bearing by the shaft and the elastically deformable element, the outer ring of the second bearing being axially slideably located on the casing and engageable against at least one stop of the casing, when moved a sufficient distance in the first axial direction.

2. The axial bearing arrangement of claim 1, wherein the outer ring of the second bearing is elastically preloaded in the second axial direction toward the first bearing.

3. The axial bearing arrangement of claim 2, wherein a position of the stop of the casing is adjustable.

4. The axial bearing arrangement of claim 3, wherein the first bearing is adapted for taking up axial loads in both axial directions.

5. The axial bearing arrangement of claim 4, wherein the outer ring of the first bearing is moveable between 20/100 mm and 10/100 mm by the elastically deformable tensioning element.

6. The axial bearing arrangement of claim 5, wherein the two outer rings are always axially spaced apart.

7. The axial bearing arrangement of claim 6, and further comprising an elastic element for applying the pre-load against the outer ring of the second bearing.

8. The axial bearing arrangement of claim 7, wherein the first bearing is loadable up to a maximum load and the second bearing is loaded at an axial load greater than or equal to the sum of the pre-load and the maximum load of the first bearing.

9. The axial bearing arrangement of claim 1, wherein a position of the stop of the casing is adjustable.

10. The axial bearing arrangement of claim 9, and further comprising an elastic element for applying a pre-load against the outer ring of the second bearing in the second axial direction.

11. The axial bearing arrangement of claim 10, wherein the first bearing is loadable up to a maximum load and the second bearing is loaded at an axial load greater than or equal to the sum of the pre-load and the maximum load of the first bearing.

12. The axial bearing arrangement of claim 1, wherein the first bearing is adapted for taking up axial loads in both axial directions.

13. The axial bearing arrangement of claim 1, wherein the outer ring of the first bearing is moveable between 20/100 mm and 10/100 mm by the elastically deformable tensioning element.

14. The axial bearing arrangement of claim 1, wherein the two outer rings are always axially spaced apart.

15. The axial bearing arrangement of claim 1, and further comprising an elastic element for applying a pre-load against the outer ring of the second bearing in the second axial direction.

16. The axial bearing arrangement of claim 15, wherein the first bearing is loadable up to a maximum load and the second bearing is loaded at an axial load greater than or equal to the sum of the pre-load and the maximum load of the first bearing.

* * * * *